3,264,294
DERIVATIVES OF PYRAZINE
Dennis Joseph McHugh, Gymea, New South Wales, and Russell Johnstone, Cronulla, New South Wales, Australia, assignors to Parke, Davis & Company, Detroit, Mich., a corporation of Michigan
No Drawing. Filed Apr. 21, 1964, Ser. No. 361,559
Claims priority, application Australia, Apr. 23, 1963, 30,074
5 Claims. (Cl. 260—250)

The present invention relates to 2-(2'-pyrazinyl)benzimidazole of the formula

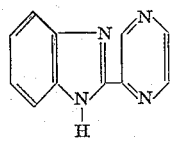

to its acid-addition salts, and to methods for their production.

In accordance with the invention, the foregoing compounds are produced by heating o-phenylene-diamine with 2-pyrazinecarboxylic acid or a reactive derivative thereof in polyphosphoric acid. Some examples of reactive derivatives of 2-pyrazinecarboxylic acid which can be employed in this process are the amide, nitrile, anhydride, lower alkyl esters, and iminoether hydrohalides. The o-phenylenediamine and the pyrazine derivative are normally employed in approximately equimolar quantities, although up to a moderate excess of either can be used. An excess of polyphosphoric acid is used, generally between about 5–20 parts by weight of polyphosphoric acid for each part of pyrazine derivative. The process is carried out by heating the mixture of o-phenylenediamine, pyrazinederivative, and polyphosphoric acid at a temperature of 150–250° C. for a period of two to six hours. Satisfactory results are also obtained by reaction conditions somewhat outside of this range. The product is present in the reaction mixture in the form of an acid-addition salt; and it can be isolated in this form or, following treatment with a base, it can be isolated as the free base. The product can also be isolated in the form of another acid-addition salt by subsequent treatment of the free base with an acid.

Also in accordance with the invention, 2-(2'-pyrazinyl) benzimidazole and acid-addition salts thereof are produced by reacting N-(o-nitrophenyl)-2-pyrazinecarboxamide of the formula

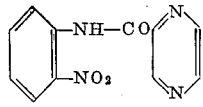

with a reducing agent whereby reduction of the nitro group and ring closure occur. In this process the ring closure is accompanied by dehydration to the indicated benzimidazole structure. Some examples of suitable reducing agents are zinc in acid medium, such as zinc in hydrochloric acid or zinc in acetic acid, as well as hydrogen in the presence of a nickel, platinum or palladium catalyst. At least the calculated amount and preferably an excess of the reducing agent is employed in order to ensure substantial completion of the process. The time and temperature required vary with the particular reducing agent but when using zinc dust in hydrochloric acid-acetic acid the reduction is substantially complete at room temperature within two hours. Depending on the reducing agent used, the product can be present in the reaction mixture in either free base or acid-addition salt form, and it is isolated either as the free base or as an acid-addition salt by adjustment of the pH. The N-(o-nitrophenyl)-2-pyrazinecarboxamide required as starting material can be prepared by the reaction of o-nitroaniline with a lower alkyl ester or an acid halide of 2-pyrazinecarboxylic acid.

2-(2'-pyrazinyl)benzimidazole forms acid-addition salts with a variety of relatively strong organic and inorganic acids. Representative pharmaceutically-acceptable salts are formed with mineral acids such as hydrochloric, hydrobromic, nitric, sulfuric, and phosphoric acids, as well as with relatively strong organic acids such as organic sulfonic acids. The acid-addition salts are converted to the free base by reaction with a base, preferably with a slight excess of an inorganic base such as an alkali metal hydroxide or carbonate, or ammonia. The free base also yields salts with strong bases. For example, a larger excess of an alkali metal hydroxide converts it to an alkali metal salt, which reverts to the free base in neutral medium. The free base and its acid-addition salts differ in solubility properties but are otherwise equivalent for the purposes of the invention.

2-(2'-pyrazinyl)benzimidazole and its acid-addition salts are of value as pharmacological agents, as chemical intermediates, and as agents for the removal of heavy metal ions such as copper from aqueous solutions. As pharmacological agents, they have a high degree of anthelmintic activity and are useful in the treatment of helminthiasis. For example, they are effective against *Haemonchus contortus* in sheep. The compounds are effective on oral administration and can be administered in pharmaceutical dosage forms or as feed supplements.

The invention is illustrated by the following examples.

*Example 1*

A mixture is prepared by blending 10.8 g. of o-phenylenediamine and 12.4 g. of 2-pyrazinecarboxylic acid with 200 g. of polyphosphoric acid at 60° C. to form a smooth paste. The mixture is heated slowly to 200° C., maintained with stirring at this temperature for five hours, cooled to about 100° C. and poured slowly with stirring into several times its volume of water. The resulting dark brown solution is filtered and insoluble material is discarded. The filtrate is adjusted to pH 7–8 with 50 percent sodium hydroxide solution and the insoluble 2-(2'-pyrazinyl)benzimidazole which separates, is collected on a filter and washed with water; M.P. 237–238° C. following crystallization from 50 percent aqueous ethanol.

*Example 2*

A mixture of 18.4 g. of 2-pyrazinecarboxamide, 16.4 g. of o-phenylenediamine, and 200 g. of polyphosphoric acid is heated in a nitrogen atmosphere with stirring for four hours at 170–180° C., cooled to about 100° C., and poured with stirring into several times its volume of water. The mixture is filtered and neutralized with sodium hydroxide solution and the insoluble 2-(2'-pyrazinyl) benzimidazole which separates is collected on a filter; M.P. 237–238° C. following crystallization from dioxane.

Example 3

A mixture of 15.2 g. of the ethyl ester of 2-pyrainecarboxylic acid, 10.8 g. of o-phenylenediamine and 300 g. of polyphosphoric acid is heated with stirring in a nitrogen atmosphere for four hours at 220° C. The mixture is cooled, poured into 500 ml. of water, filtered, and made basic with aqueous ammonia. The insoluble 2-(2'-pyrazinyl)benzimidazole which separates is collected on a filter and washed with water; M.P. 237–238° C. following crystallization from dioxane.

Example 4

While the temperature is maintained at 20–25° C. by external cooling, 15 g. of the acid chloride of 2-pyrazinecarboxylic acid is added in small portions to a stirred solution of 11 g. of o-nitroaniline in 50 ml. of pyridine. The mixture is stirred for five more hours and then poured into several times its volume of water. The insoluble product, N-(o-nitrophenyl)-2-pyrazinecarboxamide, is collected on a filter and washed with water. This product is then suspended in a mixture of 120 ml. of 4 N hydrochloric acid and 150 ml. of acetic acid, and 70 g. of zinc dust is added gradually with stirring over a period of one hour. After an additional 30 minutes, the mixture is filtered and the filtrate is made slightly alkaline with 15 percent sodium hydroxide solution. The insoluble 2-(2'-pyrazinyl)benzimidazole which separates is collected on a filter; M.P. 237–238° C. following crystallization from benzene.

Example 5

A slight excess of hydrogen chloride in ethanol is added to a suspension of 10 g. of 2-(2'-pyrazinyl)benzimidazole in 70 ml. of ethanol. The solid free base gradually dissolves and after inducing crystallization, the hydrochloride separates as a fine powder; M.P. 258–261° C. following crystallization from ethanol-ether.

A warm solution of 1.84 g. of 1,5-naphthalenedisulfonic acid disodium salt in a small quantity of water is added to a warm solution of 1.96 g. of 2-(2'-pyrazinyl-benzimidazole in 10 ml. of 1 N hydrochloric acid. The mixture is cooled and the 1,5-naphthalenedisulfonate is collected on a filter; M.P. 327–330° C. following crystallization from methanol-ether.

A slight excess of concentrated sulfuric acid is added to a solution of 500 mg. of 2-(2'-pyrazinyl)benzimidazole in 5 ml. of methanol. The mixture is diluted with ether and the insoluble product, the salt of 2-(2'-pyrazinyl)benzimidazole with one formula weight sulfuric acid, is collected on a filter; M.P. 236–238° C. following crystallization from methanol-ether.

With warming, 2 g. of 2-(2'-pyrazinyl)benzimidazole is dissolved in 5 ml. of 2 N nitric acid. The solution is cooled and the insoluble nitrate is collected on a filter; M.P. 208° C. following crystallization from a small volume of water.

A slight excess of 48 percent hydrobromic acid is added to a solution of 3.8 g. of 2-(2'-pyrazinyl)benzimidazole in 10 ml. of ethanol. The mixture is diluted with four volumes of ether and the insoluble hydrobromide is collected on a filter; M.P. 278–280° C. following crystallization from ethanol-ether.

What is claimed is:

1. A member of the class consisting of 2-(2'-pyrazinyl))benzimidazole and acid-addition salts thereof.
2. 2-(2'-pyrazinyl)benzimidazole.
3. 2-(2'-pyrazinyl)benzimidazone hydrochloride.
4. 2 - (2' - pyrazinyl)benzimidazole - 1,5 - naphthalenedisulfonate.
5. 2-(2'-pyrazinyl)benzimidazole sulfate.

No references cited.

NICHOLAS S. RIZZO, *Primary Examiner.*